May 30, 1939. M. B. MAYER ET AL 2,160,747

SAFETY CONTROL FOR HYDRAULIC BRAKE APPLIANCES

Filed Aug. 4, 1937 2 Sheets-Sheet 1

Inventors:
Margaret B. Mayer
and Frederick S. James
By V. W. Williamson
Attorney.

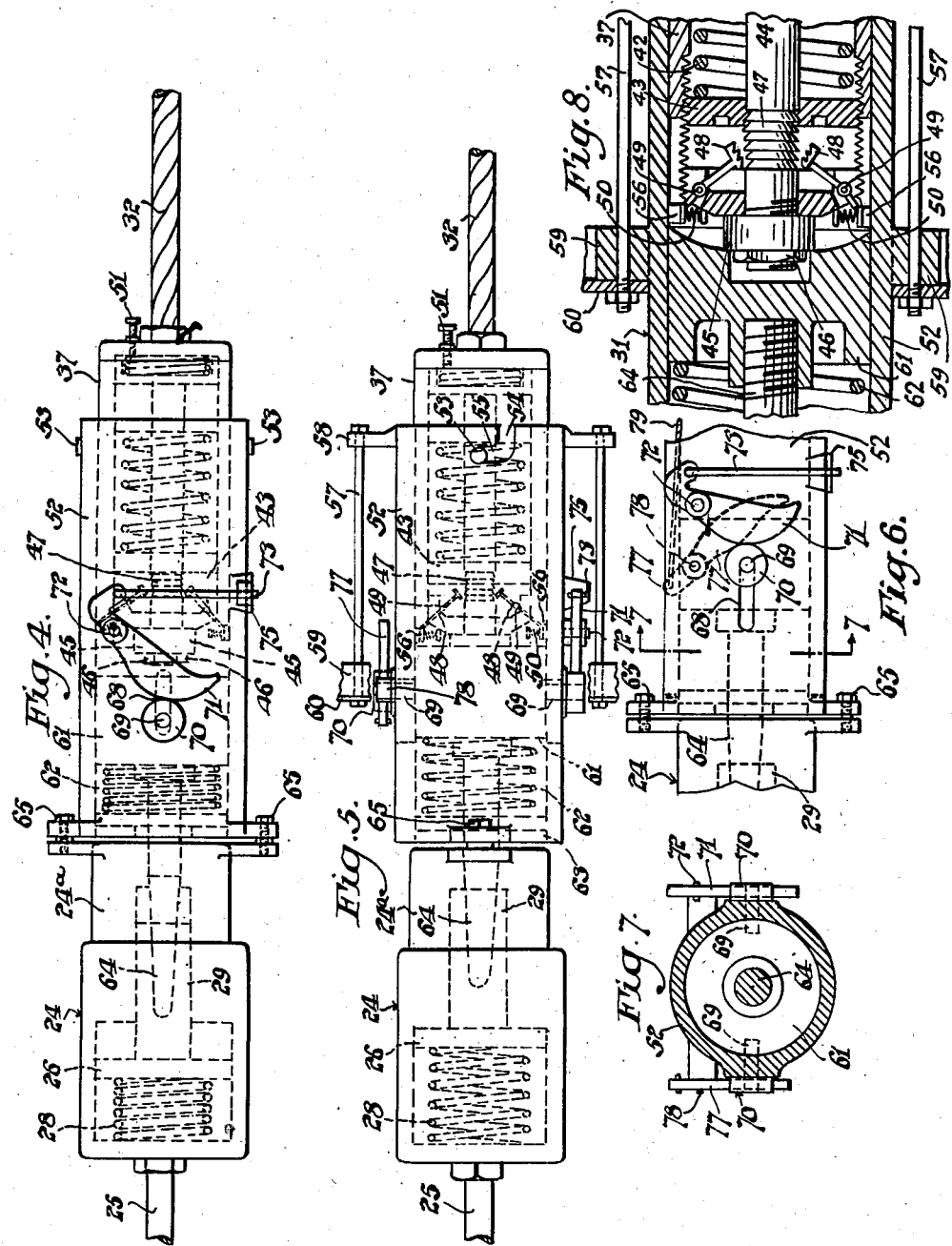

Patented May 30, 1939

2,160,747

UNITED STATES PATENT OFFICE 2,160,747

SAFETY CONTROL FOR HYDRAULIC BRAKE APPLIANCES

Margaret B. Mayer and Frederick S. James, Philadelphia, Pa.

Application August 4, 1937, Serial No. 157,252

5 Claims. (Cl. 188—3)

Our invention relates to a new and useful safety control for hydraulic brake appliance and has for one of its objects to provide a device of this character which is particularly adapted for use in connection with the hydraulic brake appliance shown and described in our application for Letters Patent, Serial No. 151,392 dated July 1, 1937.

Another object of the invention is to provide means for releasing the brakes on a trailing vehicle at the time such vehicle is connected with the tractor vehicle.

Another object of the invention is to provide mechanism in connection with the brake coupling shown in our above mentioned prior application which will automatically release the trailer brake appliance at the time the trailer is coupled to a tractor and which will also automatically apply the brakes on the trailer at the time the trailer is uncoupled from the tractor or should said trailer be accidentally disconnected from the tractor.

Another object of the invention is to provide means for manually applying trailer brakes independently of the application of the brakes on the tractor while the trailer is coupled to the tractor.

Another object of the present invention is to provide means for detachably connecting complete braking systems of two or more vehicles whereby the pressure in the brake system of the tractor vehicle will be transmitted to the braking system of the trailing vehicle or vehicles and further to provide mechanism in connection with said detachable coupling means for actuating the operation of the latter to release the brakes of the trailing vehicle or vehicles at the time said trailing vehicle or vehicles are connected with the tractor vehicle, to place all of the braking systems in proper communication for functioning under the impulse of an operator's foot which operates the brake pedal in the tractor vehicle, and further to provide means for independently actuating the trailer brake system or systems should this become necessary or essential.

With the above and other objects in view, this invention consists of the details of construction and combination of elements hereinafter set forth and then designated by the claims.

In order that those skilled in the art to which this invention appertains may understand how to make and use the same, we will describe its construction, referring by numerals to the accompanying drawings forming a part of this application, in which:—

Fig. 4 is a side elevation thereof showing the position of the parts when the trailer brake mechanism is applied even though the parts of the coupling remain in association.

Fig. 5 is a top plan view thereof.

Fig. 6 is a fragmentary side elevation similar to Fig. 4 illustrating the parts in the positions when the trailer brake is released, and, Fig. 7 is a section on the line 7—7 of Fig. 6.

Fig. 8 is an enlarged fragmentary sectional view of the coupling illustrating details of construction.

Figure 1:
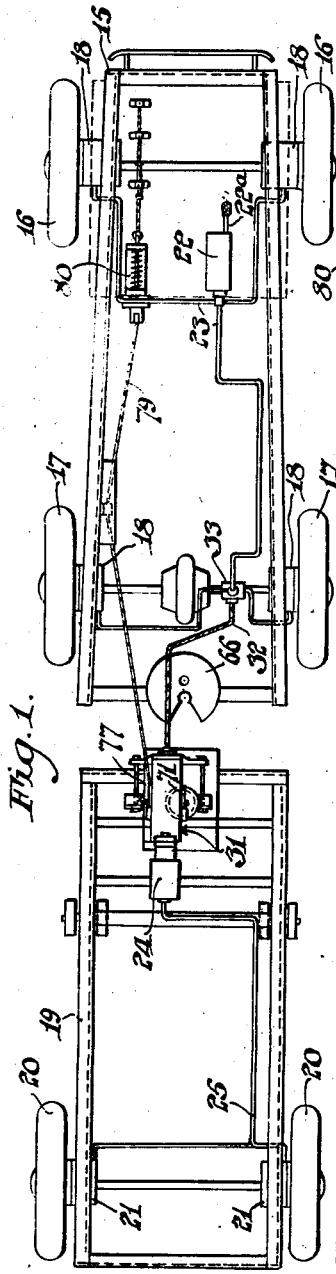
Fig. 1 is a diagrammatic plan view of a tractor and trailer just prior to being coupled together and illustrating an application of our invention.
Figure 2:
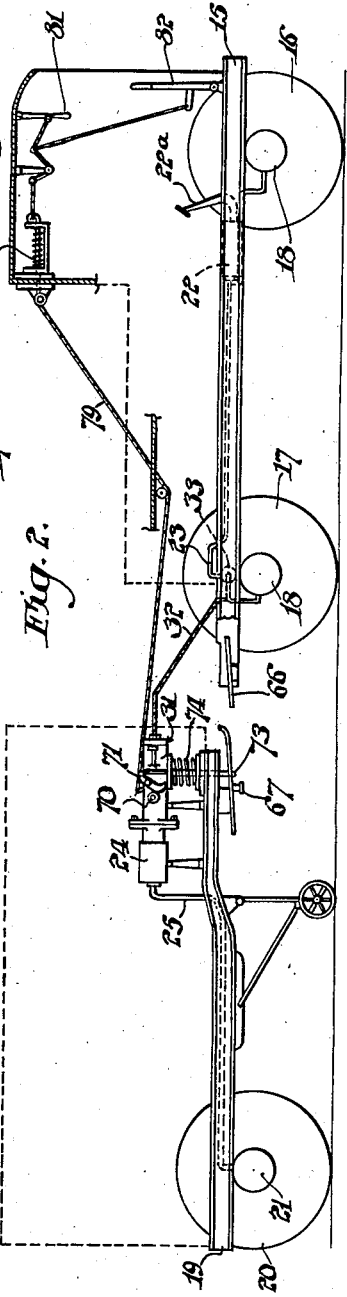
Fig. 2 is a diagrammatic side elevation of the showing in Fig. 1.

In carrying out our invention as herein embodied 15 represents the chassis of a motor vehicle or tractor provided with front wheels 16 and rear wheels 17, each wheel being provided with a brake 18 including the usual cylinders and their appurtenances. While we have shown all the wheels of the tractor provided with brakes, it will be obvious that only one pair may have brakes if so desired.

The chassis of the trailer or trailing vehicle is shown at 19 and may have one or more pairs of wheels designated by the numeral 20 and we have shown such trailer as having two pairs of wheels only for purposes of illustration. One or more pairs of the trailer wheels are provided with brakes 21 which, like the tractor, include the usual brake cylinders and other appurtenances.

Referring first to the tractor brake system, this is shown as including a master cylinder 22 which is of usual construction and supplied with a suitable brake fluid in the usual manner. The master cylinder, being of usual construction, has a piston therein for displacing the fluid, which piston is actuated whenever desired by a pedal 22a. Connected with the master cylinder are suitable conduits 23 leading to the several brakes and these conduits may be arranged in any suitable manner so long as they communicate with the master cylinder, but generally there is a trunk conductor with branches leading therefrom.

Figure 3:
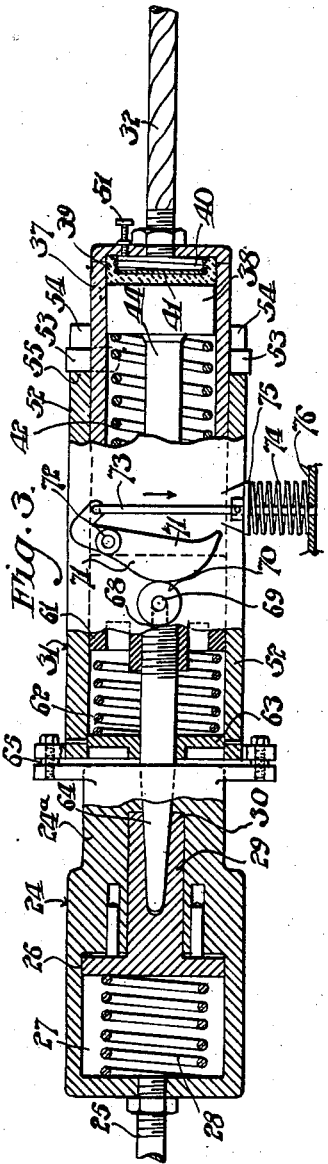
Fig. 3 is a longitudinal sectional view of the coupling and secondary master cylinder with a portion of the coupling left in elevation to show the automatic brake release.

The trailer 19 is also provided with a brake system, also including a master cylinder 24 with conduits 25 in communication with said master cylinder and with the brakes of any or all wheels of said trailer. As shown in Fig. 3 the master cylinder 24 includes a housing 24a having a plunger or piston 26 slidably mounted in the chamber 27 and normally urged towards a receded position by a spring 28. This piston is provided with a shank 29 or equivalent means for association with a part of the coupling to be presently described and said shank preferably has a tapered socket 30.

The coupling 31, by which two brake systems each on a separate vehicle are joined together, includes a male housing member 37 attached to a flexible hose 32, which hose is connected with the brake system of the tractor vehicle. When the elements of the coupling are joined together the entire coupling is supported by the trailing vehicle but when said coupling elements are disconnected the male housing member 37 will be held by any suitable means on the tractor vehicle.

A convenient way of connecting said flexible hose to the brake system is to provide a four way fitting 33, Fig. 1, so that one of the conduits 23, as a trunk conduit, may be connected to one of the ports of said fitting, while two opposite ports may be used for connecting conduits 23 which lead directly to the rear wheel brakes.

The flexible hose 32 is suitably attached to another port of the fitting 33 and leads to the housing 37 of the male member of the brake coupling.

In the housing 37 of the male member of the coupling is slidably mounted a piston 38 carrying a flexible cup washer 39 against which the fluid in the brake system operates for moving the piston 38 in one direction. Between the cup washer and the adjacent end of the housing 37 is located a spring 40 and if desirable a metal disc 41 may be interposed between the cup washer and said spring. Said spring 40 will function as a buffer for the piston and its component parts as said piston is retracted. The piston 38 is moved forwardly by the fluid in the brake system with which the male coupling member is connected each time the brake pedal 22a is actuated and the distance of the movement of said piston is in proportion to the movement given to the brake pedal and when said brake pedal is released so as to relieve the pressure on the piston 38, the latter is moved rearwardly towards its normal at rest position by the spring 42 in engagement with said piston and an adjustable apertured partition 43 having threaded connection with the housing 37.

The piston or plunger 38 carries a rod 44 which projects through the aperture in the adjustable partition 43 and on said piston rod 44 adjacent its outer end is screw-threaded a contact plate 45 which is held in an adjusted position by a lock nut 46. This piston rod is provided with a series of ratchet teeth 47 to be engaged by the heads of the pawls 48 pivoted to the housing 37 at 49, and said heads are urged towards the ratchet teeth by springs 50 coacting with the tails of the pawls. In order to relieve any air from the fluid chamber of the housing 37 a bleeder 51 may be provided.

The male member of the coupling is to be detachably connected with the female member or housing 52, and for convenience of illustration we have shown lugs 53 on the male member, which will enter the longitudinal portions 54 of bayonet slots, and upon rotating the male housing 37 the said lugs 53 will enter the arcuate portions 55 of said bayonet slots. As the two members of the coupling are connected by the rotation of the male member 37, the tail pieces of the pawls 48 will ride on the cam lugs 56, provided on the internal cylindrical surface of casing 52 and release the pawls from the ratchet teeth 47, thereby releasing the piston 38 so that it may move forwardly as occasion requires.

With the pressure released from the braking systems of both vehicles and the plunger 38 in its retracted position due to the urge of the spring 42, when the male housing member 37 is rotated preliminary to removal of said member 37 from the casing 52 the pawls will be disengaged from the cam lugs 56 and caused to engage the ratchet teeth 47. This will hold the plunger 38 and component parts in the retracted position and prevent the same from being actuated at each application of the brakes of the tractor vehicle during the time the trailing vehicle is uncoupled from the tractor vehicle. Such a holding means is necessary in order to maintain an even pressure in the brake system of the tractor vehicle because said pressure is greater than the tension of the spring 42 when a brake application is made.

The housing 52 is suitably mounted on the forward end of the trailing vehicle as by bolts 57 through ears 58 and 59 or their equivalent formed on the housing 52 and through some suitable portion 60 of the trailing vehicle as shown in Figs. 5 and 6.

Within the housing 52 is a sliding piston 61 which is to be engaged by the end of the piston rod 44 or the contact plate 45, or both, so that under certain conditions the pistons 38 and 61 will operate in unison and said piston 61 is urged towards the outer end of its housing by a spring 62 engaging said piston and a guide 63 mounted in the housing 52. The piston rod or operating stem 64 is carried by the piston 61 and projects through the guide 63 for connection with a portion of a secondary brake system, for instance, said rod or stem 64 may engage a shank 29 and in fact, the outer end of said rod 64 may be tapered to enter the socket 30. In order to retain the female housing in proper alignment with the master cylinder 24 on the trailing vehicle, said master cylinder and the female housing may be connected together by suitable fastening devices such as bolts 65 passing through ears or flanges on the members.

In order to couple the trailing vehicle to the tractor vehicle, I have shown the latter as provided with the usual fifth wheel 66 which is mounted in any well known or desired manner and a kingpin 67 on the trailer vehicle cooperates with the fifth wheel when coupling two vehicles together. In coupling the two vehicles together, the tractor is merely backed under the front end of the trailer until the kingpin enters the frog of the fifth wheel and thereafter is fastened by any suitable latch.

The female member or housing of the coupling has a pair of longitudinal slots 68 in opposite sides, through which trunnions 69 project, said trunnions being carried by the sliding piston 61 and on the outer ends of these trunnions are mounted wheels or rollers 70.

Cooperating with one roller 70 is a cam lever 71 pivoted at 72 on one side of the female member or the housing 52 and pivotally connected with said cam lever is a rod 73 which projects below the trailer chassis and in the path of travel of the fifth wheel 66, said rod being normally urged downwardly or longitudinally by a very strong spring 74 having one end in engagement with a bracket 75, as the stationary element, and the other end coacting with a suitable collar or plate 76 fixed to said rod 73.

When the trailer is separated from the tractor said spring 74 moves the rod 73 downwardly as shown by the arrow in Fig. 3 which will move the cam lever to the position shown in Fig. 4, thereby moving the sliding piston 61 outwardly in order to transmit a similar movement to the plunger 26 for displacing the brake fluid from the chamber 27 in the auxiliary or secondary master cylinder 24 to cause an application of the trailer brakes. The above action occurs any time there is nothing to interfere with the movement of the rod 73, but when the tractor is being coupled to the trailer the fifth wheel 66 will ride under the lower end of said rod 73 and move the latter upward against the action of the spring 74 to move the cam lever to the position shown in Figs. 3 and 6, thus releasing the sliding piston 61 and the plunger 26 so that they may be returned by their springs to the off positions thereby releasing the brakes of the trailer, providing the brakes of the tractor are in the released positions. The release of the trailer brakes places them in condition to be actuated by the brake system of the tractor in the ordinary manner.

When the two vehicles are coupled together, it will be obvious that the brake systems of both vehicles may be actuated by the foot pedal in the ordinary manner, but if, for any reason, the two vehicles are separated, the fifth wheel 66 will be withdrawn from the rod 73 so that the spring 74 may function and set the brakes on the trailer causing it to come to a standstill and likely prevent an accident which might otherwise occur.

On the opposite side of the female member or housing 52 is another cam lever 77 pivoted at 78 and coacting with the other roller 70 which is journalled on the trunnion carried by the sliding piston 61. To the upper end of said cam lever 77 is detachably connected any suitable cable 79 running to the tractor vehicle, said cable running through suitable guide pulleys where necessary and may be retained in a taut condition by a spring 80. The forward end of said cable 79 is connected to any suitable emergency brake mechanism which may include an overhead hand lever 81 and may also be connected to the usual emergency handbrake lever 82 of the tractor, so that the operation of either of the brake levers 81 or 82 will apply the brakes of the trailer independently of any application of the tractor vehicle brakes.

Due to the emergency connections, should the occasion arise where it is necessary to make an application of the trailer brakes, stronger than the application of the tractor brakes, or independent of the tractor brakes, the hand lever 81 can be operated so as to transmit motion through the cable 79 to the cam lever 77, causing the latter to force the sliding piston 61 outwardly, thereby expelling fluid from the chamber 27 of the master cylinder and forcing such fluid into the brake cylinders of the trailer vehicle. This will prevent any possibility of the trailer vehicle moving off to one side out of line with the tractor vehicle which sometimes occurs on steep hills or when there is an ice formation on the roadway.

From the foregoing it will be noted that as soon as the tractor vehicle is coupled to the trailer vehicle, the brake system of the trailer vehicle is in a condition to be actuated by the foot pedal, but upon operation of either of the hand levers 81 or 82 the brake system of the trailer vehicle may be independently actuated, and should the vehicles become detached so that the fifth wheel 66 is moved away from the rod 73, the brakes of the trailer vehicle will be applied. Therefore it will be obvious that the present device is not only useful as an emergency brake operating means, but can also be utilized for retaining the trailer brakes applied while the trailer is separately parked.

Of course we do not wish to be limited to the exact details of construction herein shown and described, as these may be varied within the scope of the appended claims without departing from the spirit of our invention.

Having thus described our invention, what we claim as new and useful is:

1. The combination with a tractor vehicle and a trailer vehicle, of a separate braking system on each of said vehicles, means including a fifth wheel on the tractor vehicle to couple the vehicles together, a brake coupling including a housing and a sliding piston as parts thereof to connect the two braking systems, and mechanism on said housing coacting with the piston and spring actuated in one direction to urge the piston in a direction to apply the trailer braking system, said mechanism including means to be actuated by said fifth wheel for releasing the trailer braking system to permit its operation simultaneously with the tractor braking system by an operator, in combination with manually operable means on the tractor to actuate the piston for applying the trailer brakes independently of the tractor braking system and while the vehicles are coupled together.

2. In a safety control for a hydraulic brake appliance, two braking systems, one on each of a pair of coupled vehicles, each system including a master cylinder and fluid conveying conduits, means actuated by the pressure in the conduit of one system for operating the master cylinder of the other system, and means connected with said other means and spring actuated in one direction for also operating the master cylinder of said other system and actuated in the opposite direction by the vehicle coupling to release the master cylinder in said other system.

3. In a device of the kind described, a motor driven vehicle having a hydraulic braking system, a coupling member comprising a housing, a piston slidably mounted in said housing, means to connect one end of the housing with the above mentioned braking system whereby when pressure is produced in said braking system the piston will be moved forwardly, a spring to urge said piston rearwardly, a piston rod carried by the piston and projecting from the opposite end of the housing, a trailing vehicle having a braking system and coupling member on the trailing vehicle and comprising a housing for detachable connection with the housing of the other coupling member, a plunger in the housing of the trailing vehicle coupling member for coaction with the piston rod of the first mentioned coupling member, a rod carried by said plunger and connected with the braking system of the trailing vehicle, means to urge said plunger outward, trunnions on said plunger extending through longitudinal slots in the housing of the trailer coupling member, cam levers pivoted on the sides of said last mentioned housing and coacting with the trunnions for moving the plunger forwardly, manually operated means on the motor driven vehicle and connected with one of the cam levers for actuating the same, a spring actuated means connected with the other cam lever for normally moving the plunger forwardly and actuated in the opposite direction by a portion of the vehicle coupling to release the cam lever and permit the plunger to move rearwardly.

4. In a safety control for hydraulic brake appliance, a tractor having a fifth wheel, a trailer provided with a kingpin for connection with the fifth wheel to couple the two vehicles together, a male housing connected with the braking system of the tractor, a piston therein, a piston rod carried by said piston and projecting from the male housing, a female housing mounted on the trailer to receive the male housing, means for detachably connecting said housings, a plunger in said female housing to be acted upon by the piston rod, means to urge said plunger towards the piston rod, a rod carried by the plunger, a hydraulic brake system including a master cylinder on the trailer and having a plunger with which the last mentioned rod coacts to produce pressure in the trailer braking system, trunnions on the plunger in the female housing and projecting through longitudinal slots in the sides of said housing, rollers on said trunnions, a cam lever pivoted to each side of the female housing and coacting with the rollers, a rod connected to one of said cam levers, a spring to urge said rod downward to force the plunger in the female housing forwardly for setting the brakes on the trailing vehicle, said rod being moved in the opposite direction by the fifth wheel as the tractor is being coupled to the trailer thereby releasing the spring actuated cam lever to permit the plunger in the female housing to move rearwardly and thereby release the brakes of the trailing vehicle for future actuation by the braking system of the tractor vehicle, and means on the tractor vehicle and connected with the other cam lever whereby the plunger in the female housing may be moved forwardly independent of any other operating means for setting the brakes on the trailing vehicle.

5. The structure set forth in claim 4 in combination with means to hold the piston in the male housing in a receded position when the members of the brake coupling are separated.

MARGARET B. MAYER.
FREDERICK S. JAMES.